Nov. 13, 1962 M. D. BROOKS 3,063,197
HORTICULTURAL PROCEDURE AND APPARATUS
Filed Feb. 8, 1960 3 Sheets-Sheet 2

MANUEL D. BROOKS
INVENTOR.

BY
Atty.

Nov. 13, 1962 M. D. BROOKS 3,063,197
HORTICULTURAL PROCEDURE AND APPARATUS
Filed Feb. 8, 1960 3 Sheets-Sheet 3

MANUEL D. BROOKS
INVENTOR.

BY
Atty.

3,063,197
HORTICULTURAL PROCEDURE
AND APPARATUS
Manuel D. Brooks, 224 Ave. H, Lubbock, Tex.
Filed Feb. 8, 1960, Ser. No. 7,391
14 Claims. (Cl. 47—58)

This invention pertains to a method and means for planting and subsequent transplanting delicate plants to their ultimate growing location in the field.

This invention has particular application to transplanting conifer seedlings. Traditionally conifers are seeded by large specialized nurseries. They are then shipped bare-rooted to the growing location. In certain climates these bare-rooted seedlings may economically be planted directly in the field for forest operations. However in the Southwestern United States the climate is so harsh with low humidity and high wind that there is very poor survival rate if the bare-rooted seedlings are planted directly in the field. Therefore it is desirable to first set the seedling into a block of soil in a location where the climate may be modified. With less sunlight, less wind, and frequent waterings, a more desirable growing environment is developed. After the roots become well rooted in individual soil blocks, the intact soil block is moved to the field without the shock otherwise experienced when the bare-rooted plant is moved.

Although the method and apparatus was specifically designed for the problem outlined above, I feel that my invention meets the objects listed as follows:

(1) To provide a more economical transplanting method than those now generally known and used for starting bare-rooted seedlings, seedlings direct from seed, and rooted cuttings by growing them in individual, separated soil blocks with an absolute minimum cost in partitioning materal and labor. Economy in material is effected by removing the partitioning instruments and leaving only the partitioning medium in the soil for the duration of the growing period. Economy in labor is enhanced by convenient working positions for both operator and media.

(2) To provide conditions favoring a high and satisfactory survival rate even for plants normally difficult to transplant by providing each plant with an adequate block of soil in which its roots are thoroughly embedded. The individual plants may be moved with the soil intact and with a minimum of root pruning and growth retardation due to transplanting.

(3) To provide a containerless growing and transplanting method in which dissemination of moisture is possible by gravitational percolation and capillary action throughout entire beds of root-partitioned plants giving each plant adequate water without requiring individual attention.

(4) To provide each transplant with a block of rooted soil which is not "pot-bound" due to captive root growth circumscribing and entangling its own unit of soil. Controlled escape of roots, both laterally and vertically, prevents root entanglement.

(5) To provide rooted soil blocks which are adequately bonded by the plant's own root system to prevent fracture or disintegration of the soil unit during the transplanting operation.

(6) To permit a controlled amount of root exchange between partitioned soil blocks through structure and application of partitioning materials as an aid in equalizing moisture distribution throughout entire beds of root-partitioned plants.

(7) To permit a controlled amount of root entry into subsoil material suited to specific growth requirements by extending longitudinal or transverse partitioning material under the movable soil blocks to the desired extents.

(8) To mate a highly fertile root-block soil with a selected, less fertile subsoil material having desirable moisture retaining qualities. The subsoil would absorb excess moisture from the partitioned root-block soil during irrigation and return moisture by capillary action as needed by the plants. A predominance of roots would remain within the surface soil since the physical properties of the subsoil would be much less favorable for root development. Natural soil conditions would hereby be simulated, and natural plant growth would be favored. It has been observed that even conifers may be grown in the above manner and transplanted during the growing season with a minimum of root pruning and no mortality to normal plants properly handled.

(9) To provide a horizontal-to-vertical transplanting device and method wherein seedling plant roots may be spread out naturally during the planting process and interspersed with soil while in a horizontal position.

(10) To provide a horizontal-to-vertical transplanter wherein soil blocks may be conveniently partitioned and properly packed by vertical and/or horizontal pressures with a minimum of damage to the root structure prior to erection of plants and placement in the growing beds.

(11) To provide a transplanting system in which the amount of root partitioning material used in relation to the dimensions of the soil block may be varied to suit the individual operator's desires as determined by the nature of the plant material, characteristics of the soil, seasonal, climatic, economic, and other factors. Thus, in many soils lines of cleavage will form between the partitioning material and the surface of the soil even though the partitioning material is an inch or more below the surface of the soil.

(12) To provide a transplanting method in which the soil-block size may be readily regulated to the individual plant's root requirements during the planting operation at the discretion of the operator. The adjustable dimension on a given jig would best be limited to the one parallel with the longitudinal dimension of the jig being used.

(13) To provide a soil root-blocking method in which root-block reinforcements may be readily implanted within or around the soil block during the planting operation. Reinforcements may be advantageous in soils of low adhesive qualities, large, thin, long (deep) soil blocks, plants having unusual value, plants which do not form a heavy, soil-binding root system, where plants are to be shipped considerable distances, and where plants are to be handled by novices.

(14) To provide a transplanting method wherein embedded soil binding and reinforcing material is provided with a surface handle, eye, hook, or loop as an aid in lifting and moving rooted soil blocks. Such an auxiliary device would be useful in moving individual plants from beds or growing positions without disturbing adjacent soil or plants. Also, such a lifting device would have value in handling soil blocks of unusual size and weight.

(15) To provide a transplanting method in which economical single use or re-usable semi-containers may be used to good advantage. These semi-containers would be lateral-loaded in a horizontal position and then erected in the usual manner for growing with longitudinal partitioning material between the rows.

(16) To provide individually soil-rooted, containerless plants which may be easily removed from their initial growing beds for greater convenience in budding, grafting, or pruning, and then be replanted in beds or fields for additional growing.

(17) To provide a transplanting method in which plants may be held for extended periods of time and grown to extra size by simply repeating the original "root-blocking" operation and planting the root-block to be enlarged in a larger blocking jig and adding soil to it.

(18) To provide satisfactory year around transplanting of containerless conifers and other evergreens as well as deciduous species which otherwise can only be transplanted in a balled and burlaped condition or barerooted during period of dormancy.

(19) To provide a transplanting method so readily usable at any convenient time that transplanting may be simply used as a means of pruning extraneous root growth and thereby stimulating additional root growth within the soil block. High root density within the soil block increases the physical stability of the block and helps keep the moisture absorbing capacity of the roots in balance with the transpiration of the top growth.

(20) To provide a propagation method adaptable to soils of normal clay content having good adhesive properties, good water holding capacity, and high fertility, yet which is suitable to mass irrigation by sprinkler or by gravity systems. Container grown stock is not easily adapted to gravity irrigation, and when they are irrigated in mass by sprinkler systems soils of high sand and gravel content are usually required to facilitate drainage of excess water which is applied in an effort to insure that each plant gtes adequate moisture. Soils high in sand content are low in water holding capacity, low in adhesive qualities, and low in fertility necessitating frequent "feeding" during the growing period.

(21) To provide a transplanting method in which the initial planting operation (root-blocking) may be accomplished in conveniently located areas and comfortable working positions. Both soil and plants may be transported with reusable trays to nearby growing areas.

(22) To provide a transplanting method in which time saving, pre-packed blocks of soil may be used to good advantage in the horizontal partitioning operation by "decking," "sandwiching," or "covering." A pre-packed soil block may be placed much faster by hand than a similar amount of loose soil. Also, a pre-pack would have advantages in being a measured amount of soil with a carefully regulated density, and it may have reinforcing implants of a temporary nature such as straw or of a more permanent nature such as wood or metal.

(23) To provide a root-partitioning method of producing transplants in which plants have individually rooted soil blocks separated from other similarly rooted soil blocks by three dimensional rigid or semi-rigid (poured granular material used in conjunction with film-thickness root barriers) partitioning material. The object herein is to accommodate plants having more top growth space requirements than the surface area occupied by the soil block which must be restricted in size for economy in transplanting.

(24) To provide movable, rooted soil blocks isolated from each other by moisture and fertility containing spacing materials to which auxiliary feeder roots have controlled access for the purpose of hastening growth and stabilizing moisture and fertility reserves. The auxiliary feeder roots may be pruned away or simply left hanging to the movable soil block when it is moved for transplanting.

(25) To provide a more economical method of handling transplants than containers which at the same time have the adaptability of containers for starting seedlings, for producing semi-finished plants, and even finished plants in some instances.

(26) To provide an alternative method to growing containers in which, like containers, growing may be accomplished in elevated beds, movable flats, and in ground level beds with or without direct root-block contact with surface or subsoil.

Further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing, in which.

Figure 1:
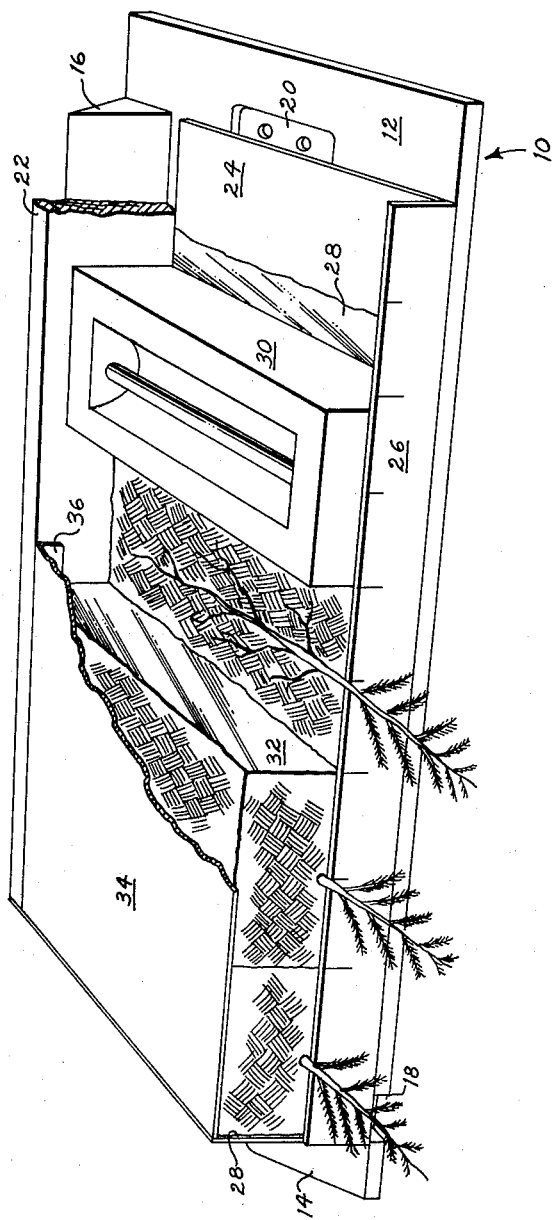
FIG. 1 is a perspective view of one embodiment of the invention, partially broken away, showing seedlings being planted in the lateral-horizontal position.

The drawings illustrate some of the equipment desirable to practice this invention. Specifically shown in FIG. 1 is rigid form or jig 10, including base plate 12. The base plate is the structural member having enough thickness for rigidity and having a rectangular shape with a width which is larger than the height of the finished soil block. It will have a length which will accommodate several finished soil blocks. End block 14 is attached securely to the plate at one end of the length. The end block has a face facing the length of the base plate which is normal to the surface of the base plate. Side block 16 is along one longitudinal edge of the base plate. It has a surface extending normal to the surface of the top of the base plate. The end block and side block surfaces are normal to each other. The base plate has two notches 18 and 20 for hand holds to remove the tray of plants that will be described later. The distance from the side block to the opposite edge is the height of the greatest soil block which will be made. If for particular operation a soil block of lesser height is desired, filler block 22 may be placed adjacent the side block. The thickness of the filler block would correspond to the reduction in height of the soil block desired.

In operation, bottom tray 24 is placed upon the base plate. The bottom tray is a plane sheet of metal with one lip 26 turned up along one of the longitudinal edges. Its dimensions are rectangular and approximately the same as the clear area of the base plate as may be seen. If a filler block 22 is used, the width of tray 24 is correspondingly reduced. The lip 26 which is turned up is equal to approximately half the thickness of the desired soil block which will be equal approximately to the height which the end block and side block project from the base plate. If thicker soil blocks are desired, a wider filler block 22 is used, also a tray with a corresponding deeper lip 26. With the tray in position, a sheet of foil 28 is placed upon the tray. The sheet of foil has a width equal to the bottom tray and a length slightly longer. (The foil extends the full length of the tray, but is illustrated broken short.) It extends up along the end block 14 and flat on the tray.

To continue in the operation, a brick 30 of any suitable material such as clay, concrete, wood or metal is placed upon the tray spaced from the end block. Therefore it may be seen that the end face, the tray and the brick create a rigid form or stated otherwise, they define a volume. With the base plate in a horizontal plane the volume so defined is filled about half full of soil, i.e. it is filled to approximately the level of the top of lip 26. Then a seedling is placed on the soil with the stem of the seedling horizontal or approximately so. The roots of the seedling are placed on the soil and spread out. The branches of the plant extend past the lip 26. Additional soil is placed within the defined volume until the defined volume is full and it will be compacted to the desired amount. In forming the soil at the top of the soil block adjacent lip 26, the operator may place his hand and pack the soil against it. Also a retainer similar to notched element 48 illustrated in FIGS. 5 and 6 and described later could be used.

Then the brick is moved and a small rectangular foil 32 is placed against soil block so formed. The brick is again placed on the tray a certain distance from the formed soil block so that a second rigid form is created, this time the bottom of the form being the tray, one side of the form being the soil block already made, and the other side being the brick. Soil is again placed in this defined volume filling the defined volume half full, the plant is placed therein, the roots arranged, the form filled with dirt, compacted, the brick moved, and another divider foil 32 placed against the side of this soil block.

Figure 6:
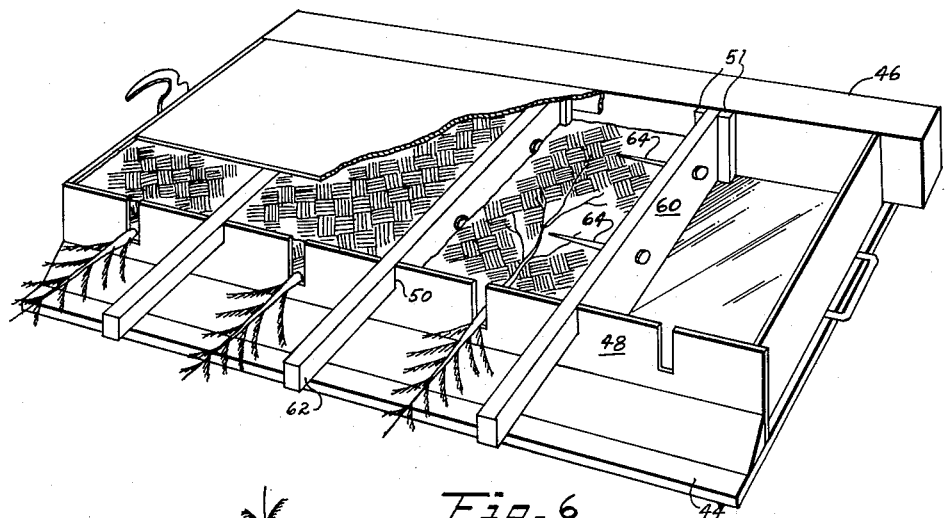
FIG. 6 is a perspective view similar to FIG. 1 of a further modification.

The process is continued until the entire tray is filled with planted soil blocks. At that time the top tray 34 is placed on the planted soil blocks. The top tray is quite similar to the bottom tray. However, the top tray need not extend the full height of the blocks and may be about ⅔ the length as illustrated in FIG. 6. It may have both ends bent downward at right angles so that it better tends to hold the planted blocks within the trays. With the top tray over the planted blocks the group of planted blocks are removed as a unit from the base plate. Picking up the bottom plate is facilitated by the fact that the base plate has notches 18 and 20 so that the fingers may go below the bottom tray. The tray of planted blocks is moved as a unit to the temporary growing location. There the soil blocks as a unit are rotated so that they are erect. The side which was the bottom is placed against the previously planted row of plants. Then the bottom tray 24 is lifted vertically from its position leaving the foil 28 in place as a block divider. Then top tray 34 is moved horizontally away from the plants.

The top tray 34 has a lip 36 which extends at right angles from the tray itself. The lip 36 is primarily for rigidity although it aids in preventing the bottom of the block from crumbling during moving and rotation. The lip 36 may cause the dislocation of a small amount of soil when this tray is removed. Such soil may be replaced by using lip 36 as a straight edge press.

It will be understood that when I say foil is placed upon the tray and as dividers between planted rows, that I contemplate any root impermeable pliable film. The term "pliable" should not be construed to mean supple. The material should be capable of bending. I use "film" to indicate that general class of sheet material which is quite thin, although not necessarily of single layer. The material should prohibit the passage of roots but not necesssarily water which may be desirable. I primarily contemplate using aluminum foil as commonly available for domestic purposes. Some good plastic films are becoming commercially available. Also asphalt coated paper, or a laminate of paper and asphalt, or asphalt impregnated felt, or other fibers, treated or otherwise are adaptable for this use.

Also I speak of the base plate as being horizontal. It is not essential that it be so. However, it is quite difficult if the base plate is tilted more than a 45 degree angle. The important thing is that the seedlings are planted laterally and then elevated so that they are vertical. The roots are easily handled because the side of the soil block is open when the roots are placed on the half completed soil block. Although generally it is contemplated that the stem of the plant will be parallel to the side of the soil block this is not essential. It is quite advantageous at times (e.g. when long narrow blocks are produced) to tilt the stem of the plant 5 or 10 degrees to the side of the soil block, then when the soil blocks are placed at the temporary growing location, the blocks are titled 5 or 10 degrees so that the stem of the plants are vertical. It is easier to have the soil blocks leaning slightly against the previously planted row of soil blocks rather than to attempt to have them absolutely vertical. The terms horizontal and vertical are used in a quite broad sense herein and do not necessarily mean that they must be horizontal or vertical with any high degree of accuracy.

When the soil blocks are to be moved from the temporary growing location to the field, a trowel or knife can be used to cut whatever roots may be growing from the corner of the soil block. The roots may be pruned periodically in this manner if root pruning is desired. There is nothing to prevent root escape from some of the corners. Generally I have found it desirable to have such situation as stated in the objects to prevent an undesirable root development. If root escape is not desired, larger pieces of foil may be used and wrapped around the corners. It usually is necessary to pass the trowel under the soil block when moving. Then the soil blocks can be removed singly to a means for transportation by which they can be carried to the field. Or they can be removed by trays and transported to the field and at the field broken down to the single soil blocks for planting.

Foil may be placed in the tray along the side block 16. In such a situation there will be a partition between the soil block and the supporting soil structure, preventing any root growth downward, however in general I have found this undesirable. It is desirable that there should be moisture contact between the soil block and the supporting structure. This makes it easier to water the entire group. If the sprinkler malfunctions so that a particular soil block gets additional water than others, the additional water will drain to the subsurface structure below the soil block. It is particularly desirable to have this subsurface structure of a nature so that the transfer of moisture is rather free so that the excess moisture is easily transferred to adjacent soil blocks or in case the soil blocks themselves become dry, the subsurface releases moisture back to them.

Sometimes it is desired to have additional branch space but still restrict the soil space. This is easily accomplished by leaving a vacant soil block as the soil blocks are planted on the tray. The trays may be staggered so that each planted plant has four adjacent unplanted soil blocks but is diagonally connected to four planted soil blocks. Anyone with skill in the art can arrange the relationship of planted and unplanted blocks in desired patterns.

Figure 2:
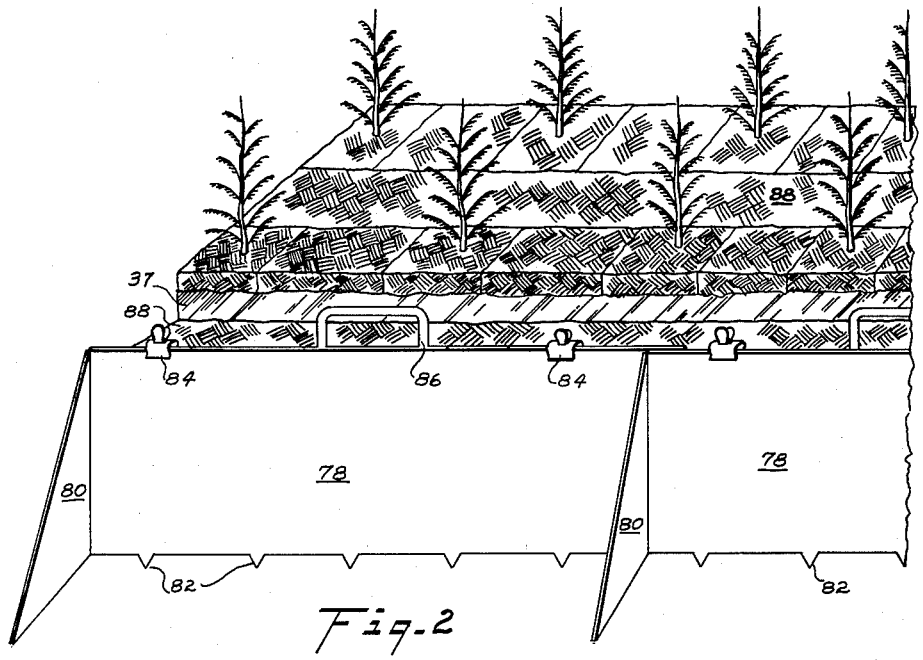
FIG. 2 is a perspective view of seedlings in soilblocks according to this invention set with restricted soil space and expanded air space in a temporary growing location.

FIG. 2 illustrates a type of partition 78 which may be used in setting the blocks. It is in general a plane except for lateral brace 80. One edge of each partition is kept erect by its own brace 80, the opposite edge is supported by proximate brace 80 of the adjacent partition 78. Along the lower edge of the plane's surface are teeth 82 for preventing slippage of the partition along the ground. Clips 84 on the upper edge hold pliable foil against movement. Also handle 86 is provided along the upper edge for ease in handling. The partition 78 would be used to place filling materials between soil blocks. If additional space were desired between two rows of soil blocks, a row would be put down, pliable film would be placed against it, and then the partition as shown in FIG. 2 would be placed at space distance from the row of blocks. Foil would be clipped to the partition with the clips. The space between the partition and soil blocks could be filled with filling material 88 such as soil, sand, compost, or sawdust. Then another row of planted blocks could be placed against the partition and the partition moved having released the film from the clips.

It may be in certain applications it is not desirable to have the boundary material of foil to extend to the top of the soil block. It might be desirable to have the foil extend for three-fourths the height of the soil block but the upper one-fourth to be undivided. There would not be appreciable root growth in the top layer of soil but this would aid in the free exchange of moisture in the watering operation. FIG. 2 illustrates the foil 37 below the upper surface of the block.

Figure 3:
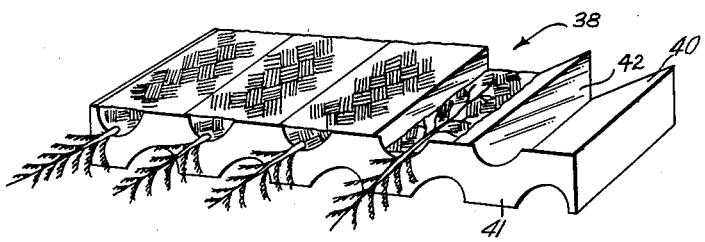
FIG. 3 is a perspective view of a modified version of the rigid form illustrated in FIG. 1.
Figure 4:
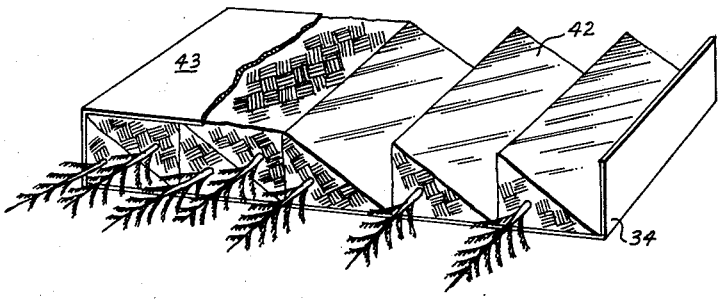
FIG. 4 is a perspective view, partially broken away, showing the second step of practicing the invention with the modified version of FIGS. 3 and 4.

Other types of rigid forms might be used to form the soil blocks. One of particular interest would be the zig-zag type illustrated in FIGS. 3 and 4 to plant triangular soil blocks.

Zig-zag form 38 is used. The zig-zag form is a long strip of sheet metal or other material which has been bent so that each panel 40 is at an angle to the adjacent panel. The width of the strip would be the height of the soil block and the distance between the bends in the panel would be the width of the soil block. In use the zig-zag form is placed upon a horizontal surface and the longitudinal edge is abutted against a vertical surface. The horizontal and vertical surface may be of a rigid form 10 as illustrated in FIG. 1 or it may be of any other surface which is conveniently found. A strip of foil 42 is placed over the zig-zag so that the film 42 is a zig-zag pattern itself. Then the plants are planted within the volume defined by two adjacent panels, i.e. the volume is first half filled with soil, the plant is placed with the roots spread out on the soil and the volume completely filled with soil and packed down. After all the volumes so defined by the zig-zag form have been filled, a top tray similar to tray 34 is placed over the material. Then the tray is turned upside down so that the planted volumes are against the horizontal supporting surface, resting on the top tray. Then the zig-zag form 38 is removed. However there will be triangular volumes defined by the soil blocks already planted. Into these volumes again soil is placed half way filling the defined volume and a small plant laterally placed with the root spread out and the stem horizontal and additional soil placed within the rigid form and the planting completed as before. When both sides of the zig-zag form have been planted, a sheet of film is placed across the completely planted zig-zag form so that it is separated from the adjacent planted material.

Another tray 43 is placed on it and the double planted tray is moved to the temporary location.

Guides 41 may be used along the longitudinal edge of the form which will become the top of the soil block. They extend in a plane normal to every panel 40, thus stiffen the form 38. Arcuate notches are provided to position the stems.

An alternate method of operation would be not to remove the form 38 after the form is turned upside down. Paper, to act as anti-friction, is placed over the form and the other half planted. Upon removal to temporary location the form would be slipped out vertically.

It will be noted in all embodiments that a rigid form is used upon which to spread the film. In the temporary growing location the only separation between soil blocks is the inexpensive pliable root impermeable film.

Figure 5:
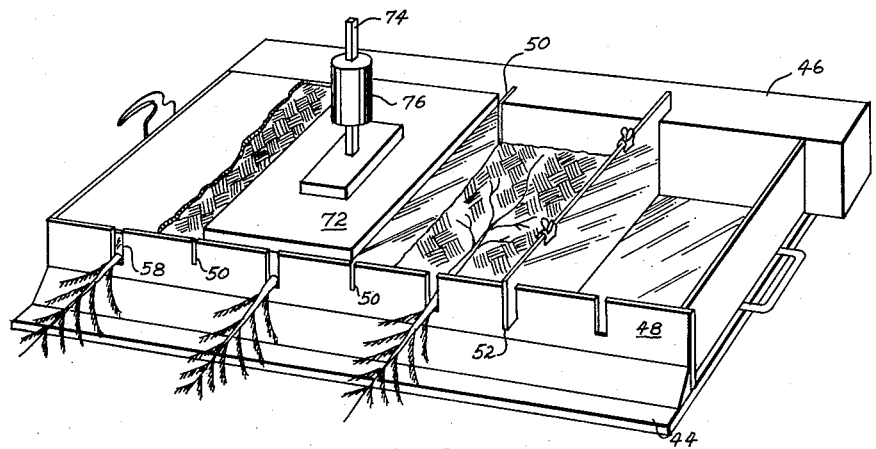
FIG. 5 is a perspective view similar to FIG. 1 of another modification.

Another variation is shown in FIGS. 5 and 6. In these embodiments there is base plate 44 with side block 46 firmly attached to the base plate. Top side block 48 is securely attached to the base plate so that the working surface of the block 48 is parallel to the working surface of the block 46. Within the working surface of the side blocks 46 and 48 are series of grooves 50 in which dividers of a permanent or temporary nature may be placed.

Divider 52 (FIG. 5) is a temporary divider. The bottom tray would be placed upon the base plate as before, film placed upon the bottom tray, and a divider 52 placed in a groove adjacent to the end block. Notch 58 is provided in the top end plate 48 for the stem of the plant to protrude. After the first soil block is formed, the divider 52 is moved to the next position to form the next soil block.

Alternatively all dividers 52 with film may be inserted after the film is placed on the bottom tray. Then all volumes are half filled with soil at one time, seedlings placed in all blocks at one time, more soil added to all blocks, and the dividers (less film) removed in a continuous operation.

A permanent type divider might be that illustrated as numeral 60 (FIG. 6). In this case the tray would be placed upon the base plate, film placed upon the tray, and as many of the dividers 60 put in place as there would be soil blocks. Then each of the soil blocks would be planted leaving the dividers 60 in place. The dividers 60 would remain with the soil block until it was ultimately transplanted in the field. These permanent dividers may be made of wood or other inexpensive material. Guide rails 51 rather than slots would be used as it is undesirable that the divider extend below the bottom of the block. The bottom tray is notched to accommodate the rails 51. They may have a handle 62 which extends above the soil block in its finished position. Two spikes 64 are nailed through the divider portion and into the soil block. These spikes would act as a reinforcement or entanglement, i.e. they would tend to reinforce the block and make it stronger.

When it becomes necessary to remove the plants from the temporary location, the blocks may be easily moved by the help of the handle 62. Also the reinforcement can be the basis of the wrapping or cover so that in effect it is quite simple to "ball" the soil block and transport it. The reinforcement or divider may in this case form a useful adjunct in preventing the soil block from being crushed and the spikes will tend to hold it together. It may be desirable to use an L shaped or U shaped divider with one main portion extending along one side and a second portion at right angles extending along the bottom of the soil block or along the side of the soil block or along one side, the bottom, and the opposite side of the soil block. Instead of using a wooden divider with spikes through it, it might be found to be desirable to use a metal divider with triangular shaped prongs punched from it and extending in to the soil block being bent from the divider.

A divider might be used which had appreciable thickness. Examples of such might be a plate of concrete or pumice stone cast to the desired dimensions. The desirability of having such a three dimensional spacer (or spacer with appreciable thickness) would be that additional leaf and branch space could be obtained while still limiting the soil for root growth.

Figure 7:
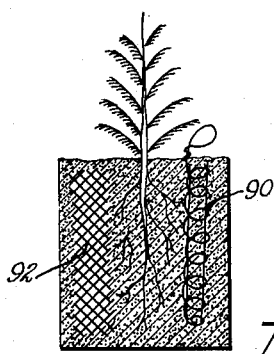
FIG. 7 is a longitudinal section of a soil block with seedling and two types of reinforcing implants.

It is often desirable to have some reinforcement material having a tortuous surface within the soil block. This material is illustrated in FIG. 7 as being a spiral wire 90 with a loop above the surface of the block. Therefore the loop forms a convenient member to grasp with the hand to handle the soil block and lift it from its resting place. Alternately a zig-zag piece of metal or expanded metal lath 92 might be used. Other forms of an entanglement will readily suggest themselves to the persons with ordinary skill in the art. The entanglement should be a maze or labyrinth with jagged or irregular surfaces. It could take the form of an inverted trellis. Another form might be a scraggy or rough surfaced branch from a tree. Or it might be any other piece of material having an intricate form with snags and prongs or a plurality of indents. If the entanglement which is embedded in the soil block is made of metal it should be of a metal which will rust within a reasonable time. Otherwise the roots might grow through a perforation therein and as the root grew be chocked by its confinement. Or the entanglement might be made of plastic which had insufficient strength to retain its form by the pressure of the root growth. A serrated or notched stick of wood or plastic would be of aid in this regard.

Also illustrated in FIG. 5 is a tramper with plate 72 which has the dimensions of one side of the soil block. Projected at right angles from the center of this plate is stanchion 74. Around this stanchion and mounted for reciprocation thereon is a weight 76. After the soil has been placed in the defined volume, the plate is placed against the soil and the weights are dropped upon the plate two or three times to compact the dirt to a controlled degree. Referring to FIGS. 1, 5, and 6, the side block may be adjustable upon the base plate. In this respect the block could be moved so that the ultimate height of the finished soil block would be more or less.

After a period of growth at a temporary location, more growth may be desired than available in the original soil block. In such circumstance the plant may be re-blocked using a new rigid form with a large volume of the desired extent. The original block is planted in the new block by the same procedures used with the original bare-rooted seedling.

Ordinarily when the plant is moved to the field, the film will be removed from around the block. However, for nursery operation it may be planted with the film partition still around it, particularly if the soil block has been enlarged by re-blocking. In such instance the plant may be quickly removed for balling and burlaping.

It will be apparent that the embodiments shown are only exemplary and that various modifications can be made in construction, materials, and arrangements within the scope of the invention as defined in the appended claims.

I claim as my invention:

1. The horticultural method comprising: placing a pliable film on a rigid form, placing soil over the film, embedding an item to be planted in the soil, embedding an entanglement in the soil, and separating the rigid form from the intact unit of soil and film.

2. The invention as defined in claim 1 wherein the soil and rigid form are rotated from horizontal at the time of planting to vertical at the time of separation.

3. An article of manufacture comprising: a bed of soil, plants within said bed in some pattern, and vertical partitions between adjacent plants, said partitions being a pliable film of root impermeable material, the partitions having openings at some corners around the plants so that the roots of any plant may grow out of its partition area at such an open corner.

4. An article of manufacture comprising: a block of soil; a plant within said block; a rigid partition member along one side of the block of soil; and an entanglement attached to said partition member, extending from said partition member and embedded in the block of soil, a second block of soil; a plant within said second block; a second rigid partition member along one side of the second block of soil and a second entanglement attached to said second partition member, said first block of soil contacting said second partition member.

5. The invention as defined in claim 4 wherein said partition member has appreciable thickness relative to the block of soil, so that the plant in the block of soil is limited in its spacing to another plant in a similar block of soil.

6. The method of planting rows of seedlings comprising: placing a film on a rigid surface, placing a rigid block near one end of the film, placing soil against the rigid block, placing a seedling on the soil, placing more soil upon the seedling roots until the soil is to the full height of the rigid block, thus forming a planted block of soil; moving the rigid block away from the planted block of soil for a fixed distance, placing a partition against the planted block of soil, placing soil between the planted and rigid block, placing a seedling on the soil, placing additional soil over the roots of the seedling until the soil is at the level of the top of the rigid block; continuing the process of forming planted blocks of soil until the length of the film has been planted; moving the planted seedlings to a temporary place of growing and erecting the seedlings to a vertical position at that place.

7. The invention as defined in claim 6 wherein the rigid surface is maintained with the planted blocks of soil during the move to the temporary place of growing.

8. The horticultural method comprising: spreading a pliable film over a plurality of volumes, partially filling the first defined volume with soil, placing a seedling to be planted on the soil, adding additional soil laterally to the roots of the seedling; partially filling a defined volume adjacent the first defined volume with soil, placing a seedling to be planted within said second defined volume, adding additional soil laterally to the roots of the seedings; and continuing this for a plurality of items.

9. An article of manufacture comprising: a rigid form having a plurality of defined volumes all open on one side; a pliable root impermeable film on some of the closed sides of the form; soil in the rigid form; and a seedling embedded in the soil of some of the said defined volumes, the stem of each of the seedlings transverse to the top of the rigid form and extending through an opening in the top.

10. The improved horticultural method comprising: placing a seedling within a defined volume; adding soil to the roots of the seedling laterally of the seedling stem thus forming a soil block around the roots; removing the said block from the defined volume; allowing the seedling to grow in an area of controlled climate; placing the soil block in a defined volume larger than the first defined volume; adding soil to the soil block laterally of the seedling stem, thus forming a larger soil block around the roots; removing the larger soil block from the defined volume; and again allowing the seedling to grow.

11. A horticultural device comprising: a movable, rectangular, plane bottom tray, having one longitudinal edge turned at an angle to the plane; an end block, a transverse edge of the bottom tray abutting the end block; a side block, a longitudinal edge of the bottom tray abutting the side block; a film on the bottom tray; soil on the film; plants embedded in the soil; and a cover tray on the soil opposite from the bottom tray, the cover tray retaining the soil between the bottom tray and cover tray so that the device may be translocated with the soil retained in place; the bottom tray separable from the film, soil, and plants by movement in a vertical direction; and the cover tray separable from the film, soil, and plants by movement in a horizontal direction.

12. A horticultural device comprising: a movable tray including a plurality of compartments, each compartment open at one end; a notched member abutting the end opposite the open end of each compartment; the notched member partially closing each compartment at that end; a film on the movable tray; soil on the film in each compartment; a plant embedded in the soil in some compartments; and a cover tray on the soil; the notched member acting to retain the soil along one end of each compartment; the cover tray acting to retain the soil along one side of each compartment; the movable tray and cover tray separable from the film, soil, and plants.

13. The horticultural method comprising: spreading a pliable film over a rigid support which defines a plurality of volumes, placing a seedling within each of the volumes, laterally adding soil to the roots of each seedling, moving the several seedlings with soil and pliable film to a place of temporary growing, and placing them there with the stems of the seedlings vertical and the seedlings in the same structural relationship one to another in the place of temporary growing as they occupied on the rigid support.

14. The horticultural method comprising: spreading a pliable film over a rigid support which defines a plurality of volumes, placing a seedling within each of the volumes, laterally adding soil to the roots of each seedling, moving the rigid support with the several seedlings with the soil and pliable film to a place of temporary growing, and placing the seedlings with the soil and pliable film there with the stems of the seedlings vertical.

References Cited in the file of this patent

UNITED STATES PATENTS

| | | |
|---|---|---|
| 366,776 | Johnson | July 19, 1887 |
| 603,754 | Baldwin | May 10, 1898 |
| 2,628,753 | Field | Feb. 17, 1953 |
| 2,870,575 | Weber | Jan. 27, 1959 |

FOREIGN PATENTS

| | | |
|---|---|---|
| 188,120 | Germany | July 13, 1907 |
| 852,008 | Germany | Oct. 9, 1952 |
| 15,885 | Great Britain | of 1892 |
| 453,493 | Great Britain | Sept. 11, 1936 |

OTHER REFERENCES

"Encyclopedia of Gardening" (Taylor), Third edition, published by Houghton Mifflin Co. (Boston), 1957. Pages 857 through 860, 885 through 888, and 1126, relied on.